United States Patent
Martin et al.

(10) Patent No.: US 9,578,007 B2
(45) Date of Patent: Feb. 21, 2017

(54) SECURE TRANSMISSION OF A SESSION IDENTIFIER DURING SERVICE AUTHENTICATION

(71) Applicant: Cisco Technology, Inc., San Jose, CA (US)

(72) Inventors: Antonio Martin, Nashua, NH (US); Syam Sundar Appala, Santa Clara, CA (US); Joseph Salowey, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/674,938

(22) Filed: Mar. 31, 2015

(65) Prior Publication Data
US 2016/0294797 A1  Oct. 6, 2016

(51) Int. Cl.
*H04L 29/00* (2006.01)
*H04L 29/06* (2006.01)
*H04L 29/08* (2006.01)

(52) U.S. Cl.
CPC .......... *H04L 63/08* (2013.01); *H04L 63/0236* (2013.01); *H04L 63/0272* (2013.01); *H04L 63/0892* (2013.01); *H04L 63/30* (2013.01); *H04L 67/02* (2013.01)

(58) Field of Classification Search
CPC combination set(s) only.
See application file for complete search history.

(56) References Cited

U.S. PATENT DOCUMENTS

| 2004/0098493 | A1* | 5/2004 | Rees | .............. G06F 21/6218 709/229 |
| 2005/0021771 | A1* | 1/2005 | Kaehn | ................ H04L 67/14 709/228 |
| 2007/0289006 | A1 | 12/2007 | Ramachandran et al. | |
| 2010/0242105 | A1* | 9/2010 | Harris | ................ H04L 63/08 726/12 |
| 2013/0111549 | A1 | 5/2013 | Sowatskey et al. | |

OTHER PUBLICATIONS

European Patent Office, "Search Report" in application No. PCT/US2016/023834, dated Jun. 2, 2016, 11 pages.
European Claims in application No. PCT/US2016/023834, dated Jun. 2016, 4 pages.

* cited by examiner

*Primary Examiner* — Ghazal Shehni
(74) *Attorney, Agent, or Firm* — Hickman Palermo Becker Bingham LLP (57) ABSTRACT

In an embodiment a method is performed by a network access device (NAD). The NAD transfers a first HTTPS request from a client computer (UE) to an identity provider computer (IdP). The NAD transfers, from the IdP, a preceding redirected URL in response to the first HTTPS request, to the UE and configured to cause the UE to redirect to said preceding redirected URL. Over a secure network link, the NAD receives a particular request specifying said preceding redirected URL, from the UE. Responsive to receiving the particular request, the NAD generates a response, comprising a subsequent redirected URL and a session identifier, and configured to cause the UE to redirect to the IdP over an HTTPS connection. The NAD transfers said subsequent redirected URL over the secure network link to the UE. The NAD transfers a second HTTPS request, comprising the session identifier, from the UE to the IdP.

21 Claims, 8 Drawing Sheets

SECURE TRANSMISSION OF A SESSION IDENTIFIER DURING SERVICE AUTHENTICATION

TECHNICAL FIELD

The present disclosure generally relates to computer-implemented techniques for data communications between systems in distributed network infrastructure for secure transmission of a session identifier during service authentication.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In distributed computer networks, authenticating users of costly, complex software-as-a-service (SaaS) systems is subject to well-known security issues relating to managing the online identities of users and providing effective corporate access to application systems. Single sign-on (SSO), using the security assertion markup language (SAML), is a solution to such issues in some contexts. An identity provider (IdP) computer typically authenticates an enterprise user using form-based authentication. The IdP computer sends a SAML assertion to a web service provider with attribute data about an authenticated subject, who typically is a user seeking access to a SaaS system. In many cases the subject in question has already authenticated to a personal computer or smartphone, for example, by logging in with a username and password to an app or application on a client computer or smartphone, and that device has also authenticated to a network according to a network security protocol. It would be useful to accomplish SaaS authentication without requiring the user to enter credentials a second time. There are attempts to address these issues, but they fail to do so in a secure manner with end-to-end security for all communication.

One solution involves a network access device (NAD), such as a router or switch, attaching a session identifier to a message in transit from a client to an IdP. That solution may give false confidence that the session identifier is not exposed to capture or spoofing, because the solution is based on a hypertext transfer protocol (HTTP) session that can be captured, spoofed, or succumb to other attacks such as a man-in-the-middle (MitM). Simply stated, HTTP should not be used to transport a secret across an insecure network. The problem is exacerbated when an IdP resides beyond a local network, such as in a shared datacenter or cloud computing facility. The insecurity of HTTP cannot be fixed by merely changing the communication to HTTP secure (HTTPS), because that would require a NAD to intercept and alter a message between a client and an IdP, which in itself is a MitM attack that could disturb a user experience by triggering a certificate warning or a connection refusal.

Thus, there has been no secure and seamless way to transport a session identifier between a client, a NAD, and an IdP during an SSO flow between the client and a web service provider. Lacking end-to-end security, attempted solutions fail to protect against eavesdropping or modification of a session identifier early in the SSO flow. A way is needed that provides a seamless user experience and allows for secure distribution of a session identifier between a client, a NAD, and an IdP.

DETAILED DESCRIPTION

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present invention.

Embodiments are described herein according to the following outline:
  1.0 General Overview
  2.0 Structural and Functional Overview
    2.1 Preliminary Traffic
    2.2 NAD Engagement
    2.3 Authorization
    2.4 Fall Back Authentication
    2.5 Functional Decomposition
  3.0 Process Overview
  4.0 Office Deployment
  5.0 RADIUS Deployment
    5.1 Preparatory Phase
    5.2 General Process
  6.0 SAML Deployment
    6.1 SAML Profile
  7.0 VPN Deployment
  8.0 Hardware Overview
  9.0 Extensions and Alternatives
  1.0 General Overview In an embodiment, a method is performed by a network access device (NAD) such as a router or switch that is positioned as an access port to a protected network. The NAD transfers a first secure hypertext transfer protocol (HTTPS) request from a client computer to an identity provider computer. The NAD transfers, from the identity provider computer, a preceding redirected uniform resource locator (URL) in an HTTPS response to the first HTTPS request, to the client computer. The URL in the response is configured to cause the client computer to redirect to said preceding redirected URL. Over a secure network link, the NAD receives a particular request, specifying said preceding redirected URL, from the client computer. In response to receiving the particular request, the NAD generates a particular response, comprising a subsequent redirected URL and a session identifier, and configured to cause the client computer to redirect to the identity provider computer over an HTTPS connection. The NAD transfers said subsequent redirected URL over the secure network link to the client computer. The NAD transfers a second HTTPS request, comprising the session identifier, from the client computer to the identity provider computer.

In an embodiment, a device includes a communication interface, a processor, and processor logic that causes the device to perform the steps of the method described above.

2.0 Structural and Functional Overview

Figure 1:
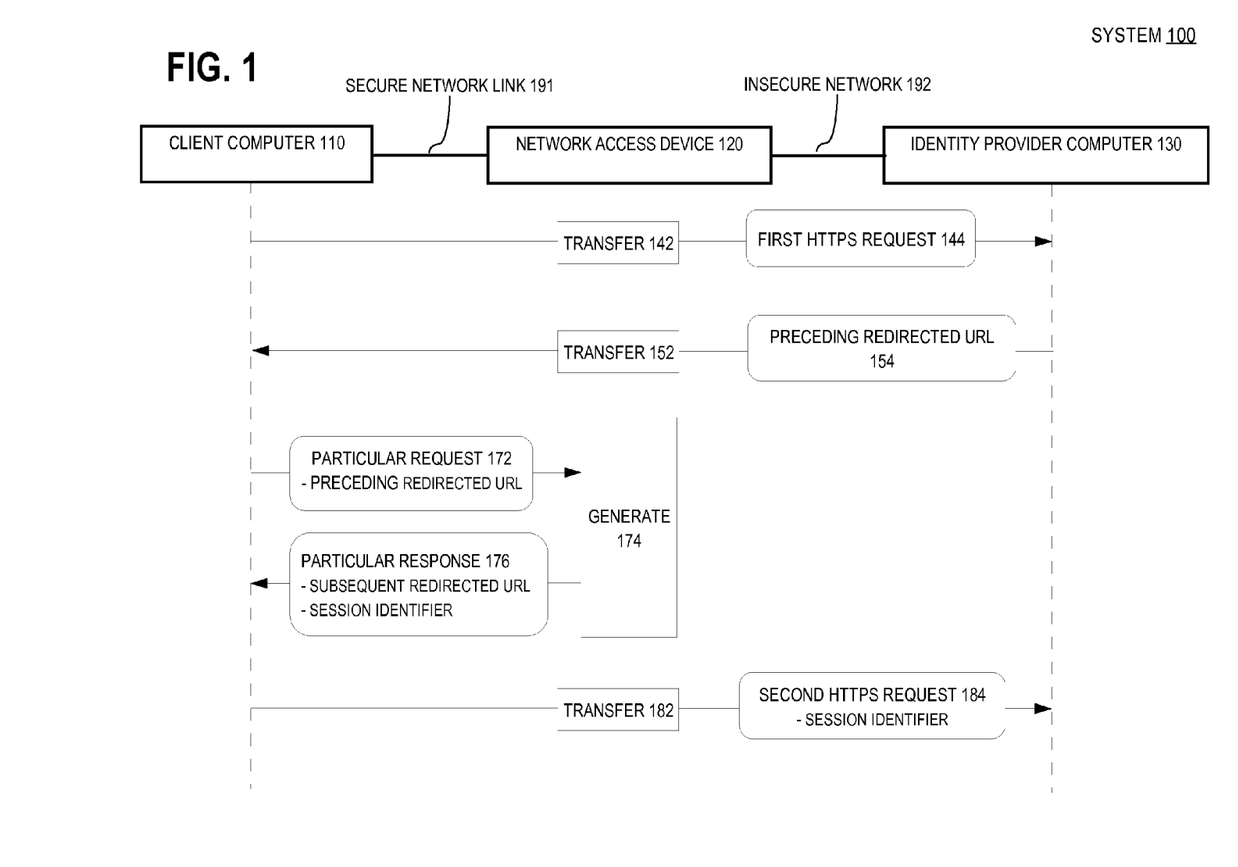
FIG. 1 illustrates an embodiment of a network system that securely transfers a session identifier.

FIG. 1 illustrates an embodiment of network system that securely transmits a session identifier. In an embodiment, steps in FIG. 1 may be performed during service authentication. In an embodiment, network system 100 comprises a network access device (NAD) 120, client computer 110, and identity provider computer (IdP) 130. IdP 130 may be any networked computer capable of hosting a web service and delivering identity information in response to requests. Client computer 110 may be a rack server, a personal computer, a tablet computer, a smart phone, or other networked computer that consumes web services, for example using a browser program.

Client computer 110 communicates with NAD 120 over secure network link 191. Secure network link 191 has an implementation of a communication medium that prevents eavesdropping. Secure network link 191 may be an encrypted wireless channel using radio transmission, a dedicated or non-dedicated point-to-point link such as a wire cable or an optical fiber, or a virtual private network (VPN) connection over an insecure network link. Client computer 110 may communicate with NAD 120, IdP 130, and other remote computers not shown. All network communication to or from client computer 110 passes through secure network link 191 and NAD 120.

NAD 120 is a network element that enables a computer to connect to an internet protocol (IP) network. NAD 120 may be a wireless access point, a switch, a router, or other network connectivity element. NAD 120 has processing circuitry and configuration sufficient to operate as an HTTP server that conditionally generates a session identifier and a uniform resource locator (URL) redirect. If NAD 120 is a wireless access point, then it is configured for physical or media access control encryption such as 802.11 robust security network or 802.1 advanced encryption.

Regardless of the physical communication medium or configuration used for NAD 120, communications transferred by NAD 120 may independently utilize a secure tunnel such as a VPN. NAD 120 may enforce a link security protocol, if any, that client computer 110 must satisfy, such as password or other authentication, before secure network link 191 can be utilized. If physical security is assured, such as when secure network link 191 is a cable, then a link layer security protocol may be unnecessary.

NAD 120 communicates with IdP 130 over insecure network 192. Insecure network 192 may be any communication link or an aggregation of links and network elements, such as a local area network, wide area network, internetwork or group of internetworks such as the public Internet. Insecure network 192 need not be secure from eavesdropping.

IdP 130 may host a web service that manages federated identity and authentication of remote principals. Depending on an implementation, computing functions of IdP 130 may include authentication of a credential, such as a certificate or password, facilitation of zero sign on or single sign on, storage of identity profiles, and integration with an authorization service. IdP 130 may authenticate principals from multiple security realms or organizations. IdP 130 may be a rack server computer, a workstation computer, a virtual instance in a private datacenter or a shared datacenter such as a public cloud computing facility, or any networked computer that includes a web server.

Although IdP 130 is shown as interacting with one NAD 120 and one client computer 110, IdP 130 may simultaneously interact with many NADs 120, with each NAD 120 simultaneously interacting with many client computers 110. Such fan out allows IdP 130 to serve many client computers, which may necessitate vertical or horizontal scaling of IdP 130. For purposes of illustrating a clear example, FIG. 1 shows a single client computer interaction with the NAD and IdP, but in practical embodiments, there may be many thousands of client computers involved in the system, and the NAD and IdP may be configured to support transactions with large numbers of client computers.

IdP 130 is configured to conditionally redirect client requests. Redirection is accomplished with a URL redirect; in a URL redirect, in one approach, a client request specifies a first URL, and a server responding to the first URL returns an HTTP response containing a second URL to the client computer that is configured to cause the client computer to immediately request the second URL. A URL redirect may be client side or server side. A server side redirect may involve sending a 300-series HTTP status code to the client. A client side redirect may involve sending to the client JavaScript for execution or a <meta> hypertext markup language (HTML) element.

2.1 Preliminary Traffic

A client may transmit a claim having evidence of federated authentication, such as by an IdP. An application or service that accepts the claim is known as a relying party application or a claims-aware application. In operation, client computer 110 invokes a service of a relying party application hosted on a service provider computer (not shown), which may be a networked computer. The service provider computer may belong to a third party and may be connected to insecure network 192. The relying party application may be, but is not limited to being, an application service provider, a security assertion markup language (SAML) service provider, a web application, a SaaS, or any other network available application that functions as a secure web service. The service provider computer and IdP 130 each host a different web service. The service provider computer hosts a web service for consumption by client computer 110, whereas IdP 130 hosts a web service that authorizes that consumption.

The relying party application is configured to rely on IdP 130 to provide federated authentication of clients. Client computers, such as client computer 110, are generic in the sense that client computer 110 need not be configured with data identifying IdP 130 or NAD 120, or programs specifically configured to interoperate with the IdP or NAD.

When client computer 110 sends a service request to the relying party application, the relying party application detects whether the service request is already authorized. If the service request has not yet been authorized, then the relying party application sends, to client computer 110, an URL redirect that specifies IdP 130 as the target. Using this URL redirect from the relying party application, client computer 110 attempts authorization by sending first HTTPS request 144, which is addressed to IdP 130. First HTTPS request 144 passes through NAD 120 on its way to IdP 130, shown as transfer 142.

Often in a SSO or zero sign-on (ZSO) environment, client computer 110 already has an ongoing authenticated session with IdP 130, in which case first HTTPS request 144 would bear a valid session identifier that IdP 130 would accept without sending preceding redirected URL 154. However in this example client computer 110 has no ongoing session with IdP 130 because client computer 100 has not yet signed on to IdP 130. Upon receiving first HTTPS request 144 and detecting no established session, IdP 130 responds to client computer 110 by sending preceding redirected URL 154. Preceding redirected URL 154 passes through NAD 120 on its way to client computer 110, shown as transfer 152.

2.2 NAD Engagement

The redirection URL of preceding redirected URL 154 specifies IdP 130 as the target host and HTTP as the transport protocol for client computer 110 to use when executing the redirect. NAD 120 is configured to recognize a request having that URL. Upon receipt of preceding redirected URL 154, client computer 110 uses it to again attempt authorization by sending particular request 172, which is addressed to the redirection URL given in preceding redirected URL 154. Because all traffic from client computer 110 passes through NAD 120, NAD 120 receives particular request 172. NAD 120 is configured to recognize particular request 172 and not transfer it to the network 192.

Upon receipt of particular request 172, NAD 120 generates a session identifier that is unique, shown as generate 174. NAD 120 may be configured to generate a session identifier that is small and opaque. NAD 120 may also be configured to achieve sparseness by including some randomness in the session identifier. NAD 120 responds to particular request 172 by sending particular response 176 to client computer 110. Particular response 176 includes the session identifier and a subsequent redirected URL. Said subsequent redirected URL specifies HTTPS as the transport protocol and IdP 130 as the host.

2.3 Authorization

Upon receipt of particular response 176, client computer 110 uses the particular response to again attempt authorization by sending second HTTPS request 184. Second HTTPS request 184 passes through NAD 120 on its way to IdP 130, shown as transfer 182. Transfer 182 may be the final step for secure transmission of a session identifier during service authentication, however and although not shown, a typical sign on and service request may follow transfer 182 and succeed in a straightforward manner, perhaps without additional redirects. Upon receipt of second HTTPS request 184 and the session identifier that is included, IdP 130 may use the session identifier to authenticate client computer 110, may optionally perform authorization such as service access control, and returns a security ticket or other temporary credential. Client computer 110 is signed on and may use the temporary credential to activate services of relying party applications.

2.4 Fall Back Authentication

The security topology of network system 100 may not always be available. In one scenario, whether connecting wirelessly or by cable, client computer 110 may roam to an untrusted NAD. In another scenario, the configuration of NAD 120 may be incomplete. In either case, the role of NAD 120 is not performed, and security cannot be guaranteed by the infrastructure of network system 100. Instead and although not shown, authentication is achieved according to additional interactions that seamlessly occurs as a fall back.

When IdP 130 sends preceding redirected URL 154, IdP 130 may not be configured with data indicating that NAD 120 is not participating as expected. Likewise, when client computer 110 responds by sending particular request 172, client computer 110 may also not be configured with data indicating that NAD 120 is not participating. In either case, fall back may still seamlessly occur. For example, perhaps only a subset of the many NADs that IdP 130 simultaneously serves may involve fall back. For another example, secure network link 191 may be bimodal and be insecure for untrusted client computers, such as one lacking a key fob or one not whitelisted. IdP 130 may simultaneously serve a mix of client computers, perhaps through the same NAD 120, with a subset involving fall back authentication.

A fall back scenario may begin when a NAD is not configured to recognize particular request 172 and instead transfers it to IdP 130 over the network 192. In this case, generate 174, particular response 176, and second HTTPS request 184 do not occur. Instead, IdP 130 receives particular request 172 and performs fall back authentication. All traffic to IdP 130 ordinarily uses HTTPS. However, particular request 172 uses HTTP, which IdP 130 recognizes as a trigger for fall back authentication.

The mechanics of fall back authentication depend on an implementation. For example, IdP 130 may issue a redirect to a login page for access via HTTPS and challenge the user of client computer 110 for a password. If fall back authentication succeeds, a typical sign on and service request may follow and succeed in a straightforward manner. IdP 130 may perform authorization such as service access control and may return a security token or other temporary credential. Following fall back authentication, client computer 110 is signed on and may use the security token to activate services of relying party applications, even though the role of NAD 120 was not fulfilled.

2.5 Functional Decomposition

Figure 8:
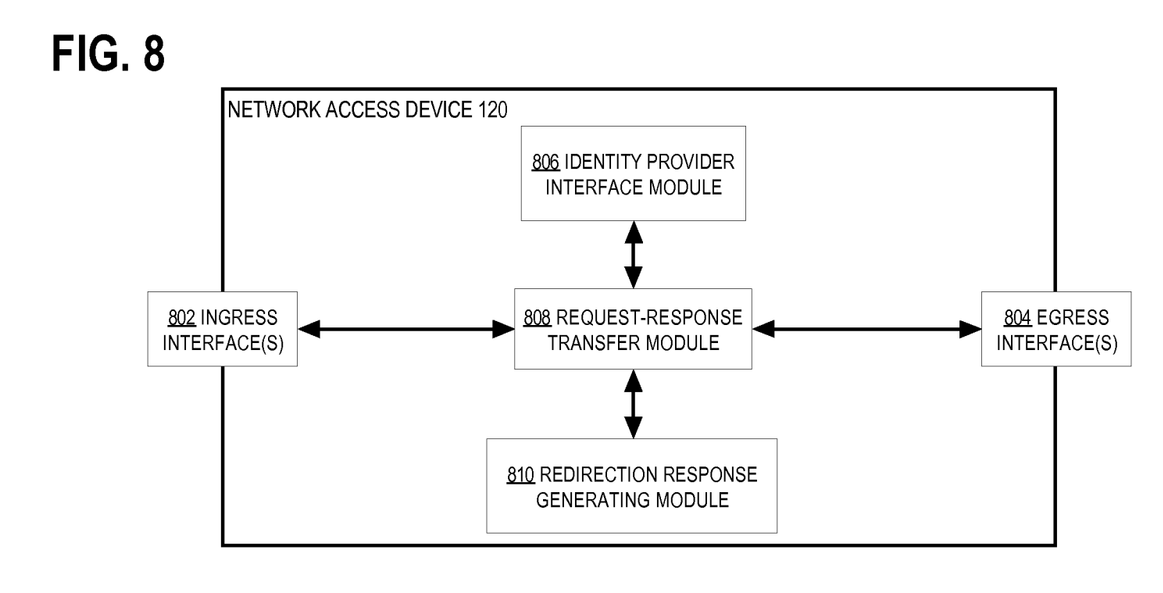
FIG. 8 illustrates a network access device upon which an embodiment may be implemented.

FIG. 8 is a block diagram that illustrates a functional decomposition of NAD 120 upon which an embodiment of the invention may be implemented. The responsibilities of NAD 120 may be implemented according to a set of modules and interfaces as shown. NAD 120 may have other modular arrangements. The modules of NAD 120 include, but are not limited to including, ingress interface 802, egress interface 804, identity provider interface module 806, request-response transfer module 808, and redirection response generating module 810. Due to inclusion of these modules within NAD 120, NAD 120 is a special purpose device. Each of these modules may be implemented as a programmable logic array, an application specific integrated circuit, or firmware.

Packet relaying occurs according to ingress interface 802 and egress interface 804. Ingress interface 802 has sufficient logic, circuitry, and/or firmware to receive packets and buffer them in a format that allows inspection. Ingress interface 802 submits buffered packets to request-response transfer module 808 for inspection. Request-response transfer module 808 has sufficient circuitry to inspect buffered packet contents. If request-response transfer module 808 decides that a buffered packet does not require special processing, then request-response transfer module 808 instructs egress interface 804 to emit the packet. Egress interface 804 has sufficient circuitry to manage a routing table, participate in the control plane of a routing protocol, make a routing decision for a buffered packet, and transmit a buffered packet through an appropriate hardware port. Both ingress interface 802 and egress interface 804 manage link layer activity such as a packet window, retransmission, acknowledgement, and timeout.

Request-response transfer module 808 may receive and recognize a particular request, such as particular request 182 of FIG. 1, that needs interception and special processing. Request-response transfer module 808 instructs identity provider interface module 806 to perform special processing of a buffered packet. Identity provider interface module 806 has sufficient circuitry to generate a session identifier and submit the buffered packet to redirection response generating module 810. Redirection response generating module 810 has sufficient circuitry to generate a redirection response with a redirected URL of a known IdP computer. Redirection response generating module 810 instructs egress interface 804 to transmit the redirection response.

3.0 Process Overview

Figure 2:
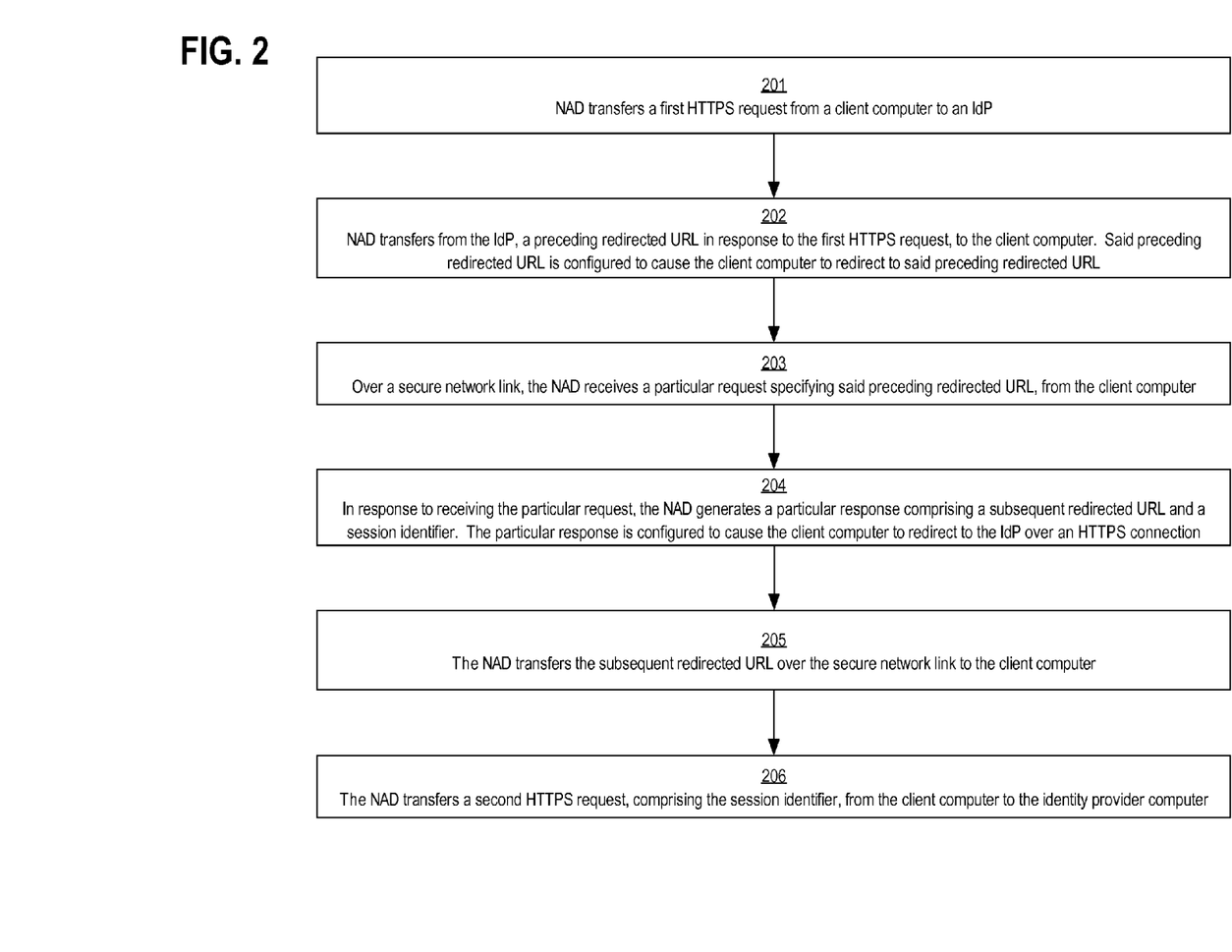
FIG. 2 illustrates an embodiment of a process that securely transfers a session identifier.

FIG. 2 illustrates a process for secure transmission of a session identifier during service authentication, in an example embodiment. For purposes of illustrating a clear example, FIG. 2 may be described with reference to FIG. 1, but it should be appreciated that using the particular arrangements illustrated in FIG. 1 is not required in other embodiments. In this example, client computer 110 performs sign on with IdP 130 as a preface to activating a service of a relying party application. Client computer 110 might not store data or configuration specifying that sign on is needed and so prematurely sends a service request to the relying party application. The relying party application detects that the service request is unauthorized and sends, to client computer 110, an URL redirect that specifies IdP 130 as the target. The process continues as follows.

In step 201, a NAD transfers a first HTTPS request from a client computer to an IdP. For example, upon receiving the URL redirect from the relying party application and in accordance with this URL redirect, client computer 110 attempts authorization by sending first HTTPS request 144, which is addressed to IdP 130. First HTTPS request 144 passes through NAD 120 on its way to IdP 130.

In step 202, the NAD transfers from the IdP, a preceding redirected URL to the client computer. For example, upon receiving first HTTPS request 144 and detecting no established session, IdP 130 responds to client computer 110 by sending preceding redirected URL 154. Preceding redirected URL 154 passes through NAD 120 on its way to client computer 110. Preceding redirected URL 154 is configured to cause client computer 110 to redirect as specified by preceding redirected URL 154.

In step 203, the NAD receives a particular request specifying said preceding redirected URL, over a secure network link from the client computer. For example, upon receipt of preceding redirected URL 154, client computer 110 uses it to again attempt authorization by sending particular request 172, which is addressed to the redirection URL given in preceding redirected URL 154. Because all traffic from client computer 110 passes through NAD 120 and regardless of what host is particular request 172 addressed to, NAD 120 receives particular request 172. Although first HTTPS request 144 used HTTPS as a transport protocol, particular request 172 may use either HTTPS or HTTP, because NAD 120 is configured to recognize particular request 172 and not transfer it to insecure network 192.

In step 204, the NAD generates a particular response comprising a subsequent redirected URL and a session identifier. For example, upon receipt of particular request 172, NAD 120 generates a session identifier that is unique. NAD 120 may be configured to generate a session identifier that is small and opaque. NAD 120 may also be configured to achieve sparseness by including some randomness in the session identifier.

In step 205, the NAD transfers said subsequent redirected URL over the secure network link to the client computer. For example, NAD 120 responds to particular request 172 by sending particular response 176 to client computer 110. Particular response 176 includes the session identifier and a subsequent redirected URL. Said subsequent redirected URL specifies HTTPS as the transport protocol and IdP 130 as the host.

In step 206, the NAD transfers a second HTTPS request, comprising the session identifier, from the client computer to the IdP. For example, upon receipt of particular response 176, client computer 110 uses it to yet again attempt authorization by sending second HTTPS request 184. Second HTTPS request 184 passes through NAD 120 on its way to IdP 130. This may be the final step for secure transmission of a session identifier during service authentication. Additionally, a typical sign on and service request may follow. Upon receipt of second HTTPS request 184 and the session identifier that is included, IdP 130 may use the session identifier to authenticate client computer 110, may optionally perform authorization such as service access control, and may return a security ticket or other temporary credential. Client computer 110 is signed on and may use the temporary credential to activate services of relying party applications.

4.0 Office Deployment

Figure 3:
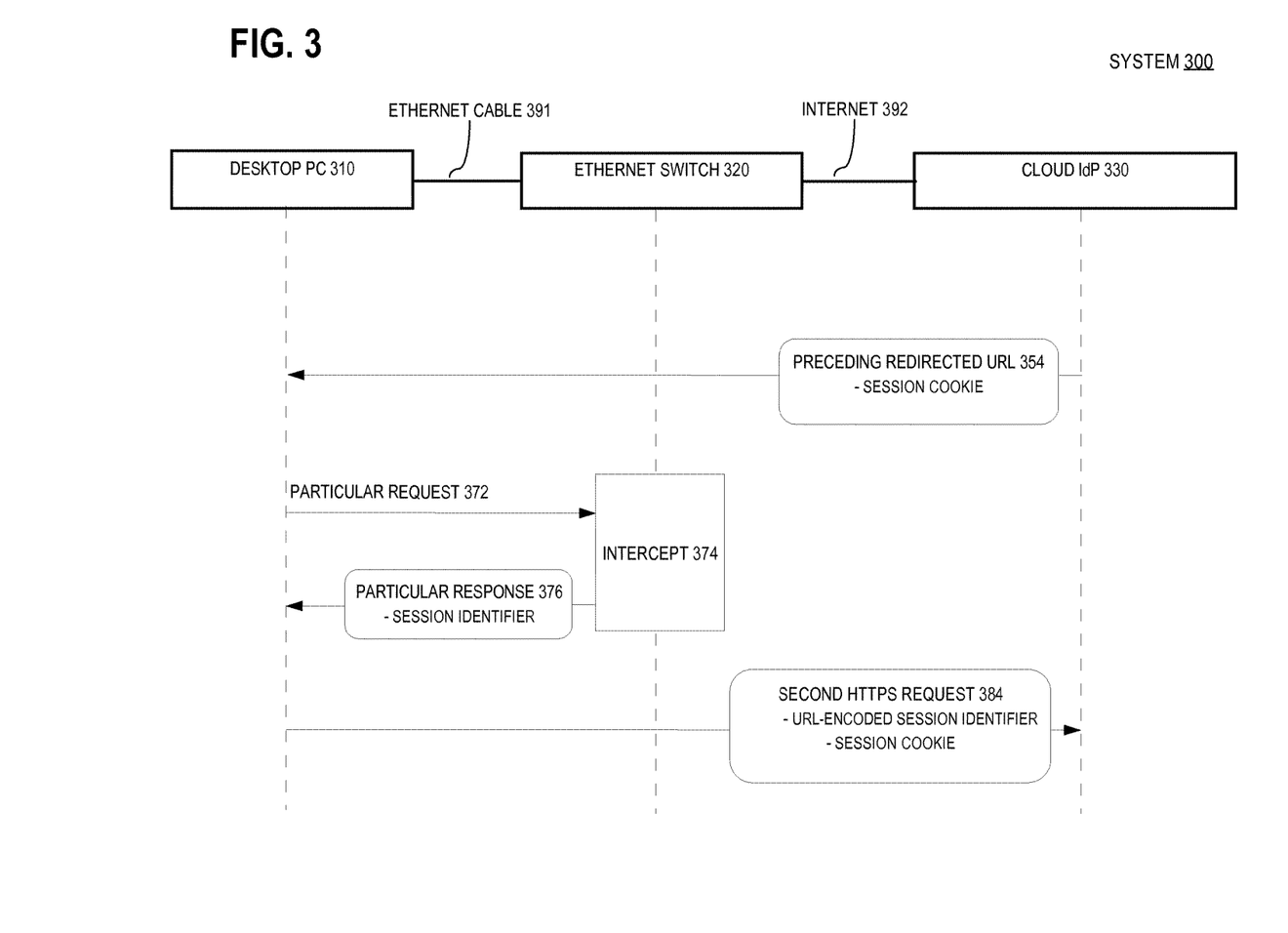
FIG. 3 illustrates an embodiment of a network system that securely transfers a session identifier.

FIG. 3 illustrates an embodiment of a network system that securely transfers a session identifier. For example, FIG. 3 illustrates an embodiment of network system 300 that places a session cookie and has an Ethernet cable and switch for physical security. Network system 300 exemplifies a typical office deployment supported by a public compute cloud. Network system 300 may be an implementation of network system 100, although network system 100 may have other implementations. Network system 300 comprises desktop personal computer (PC) 310, Ethernet cable 391, Ethernet switch 320, cloud IdP 330, and internet 392.

Desktop PC 310 may be an implementation of client computer 110. Cloud IdP 330 may be an implementation of IdP 130. Cloud IdP 330 may be a hosted IdP that is outsourced to a public compute cloud. Ethernet switch 320 may be an implementation of NAD 120. Ethernet switch 320 may be a switch or a router. Because physical security is sought in this example, Ethernet switch 320 should not be a hub. Ethernet cable 391 may be an implementation of secure network link 191. Ethernet cable 391 may be a metallic wire or an optic fiber. Ethernet cable 391 may have a range of 15 kilometers with available transceivers and fiber. Again because this example achieves security through physical isolation of Ethernet cable 391, Ethernet cable 391 should not be a bus, such as a shared cable with a cable drop for each endpoint device. The earliest forms of cable Ethernet had a shared communication medium, which is unsuitable for this example. A topology with a shared medium, such as an Ethernet bus or an Ethernet hub, may instead use the VPN embodiment illustrated in FIG. 6. Internet 392 may be an implementation of insecure network 192. Internet 392 may be the global Internet.

Components of FIG. 1 that are implemented in FIG. 3 may also have other implementations. Some features of FIG. 3 may be achieved with other implementations of FIG. 1. For example, placement of a session cookie does not require an Ethernet cable. Some implementation choices of FIG. 3 are described only as examples.

Although network system 300 implements the features of network system 100, not all of the essential interactions of FIG. 1 are shown in FIG. 3. Instead, FIG. 3 shows only those essential interactions that demonstrate custom features of network system 300. For example, first HTTPS request 144 is absent from FIG. 3 although this feature still occurs in network system 300.

In this example and although not shown, desktop PC 310 has already attempted authorization by sending first HTTPS request 144 to cloud IdP 330. Upon receiving first HTTPS request 144 and detecting no established session, cloud IdP 330 reacts with two steps. First, cloud IdP 330 generates a session cookie that is unique. The session cookie is not the same as a session identifier, although both are present in this example. Cloud IdP 330 may be configured to generate a session cookie that is small and opaque. Cloud IdP 330 may also be configured to achieve sparseness by including some randomness in the session cookie. To further ensure authenticity, subsequent requests from desktop PC 310 to cloud IdP 330 should bear this session cookie. Second, cloud IdP 330 responds by sending preceding redirected URL 354 to desktop PC 310. Preceding redirected URL 354 is configured to cause desktop PC 310 to redirect back to cloud IdP 330. Preceding redirected URL 354 will place the session cookie when received.

Upon receipt of preceding redirected URL 354, desktop PC 310 uses it to again attempt authorization by sending particular request 372, which is addressed to cloud IdP 330. Ethernet switch 320 is configured to recognize particular request 372 and not transfer it to internet 392, which is insecure. This is shown as intercept 374, which includes generation of a session identifier by Ethernet switch 320.

Ethernet switch 320 responds to particular request 372 by sending particular response 376 to desktop PC 310. Particular response 376 includes the session identifier and a subsequent redirected URL. Said subsequent redirected URL specifies HTTPS as the transport protocol and cloud IdP 330 as the host. Although particular response 376 may be delivered using insecure HTTP as a transport protocol, security is physically guaranteed by Ethernet cable 391, absent a physical attack such as a vampire tap.

Upon receipt of particular response 376, desktop PC 310 uses it to yet again attempt authorization by sending second HTTPS request 384 to cloud IdP 330. Second HTTPS request 384 bears the session cookie to further ensure authenticity. The URL of second HTTPS request 384 includes the session identifier in an URL-encoded format in the query string of the URL. Because the session identifier appears in the query string, second HTTPS request 384 may optionally be sent with a GET verb rather than a common gateway interface (CGI) POST. Because GET may lack CGI form data, implementing URL redirection may be simpler with GET than POST. Robustness is increased with GET, for several reasons. POST does not work with all 300-series status codes for server side redirection. Also, a scripted client side redirect of a POST may fail when a client operates without JavaScript, as with a dedicated application other than a web browser. The use of URL-encoding and GET may benefit other essential redirects of the invention as well.

Cloud IdP 330 may return a security ticket or other temporary credential. Desktop PC 310 is signed on and may use the temporary credential to activate services of relying party applications.

5.0 Radius Deployment

Figure 4:
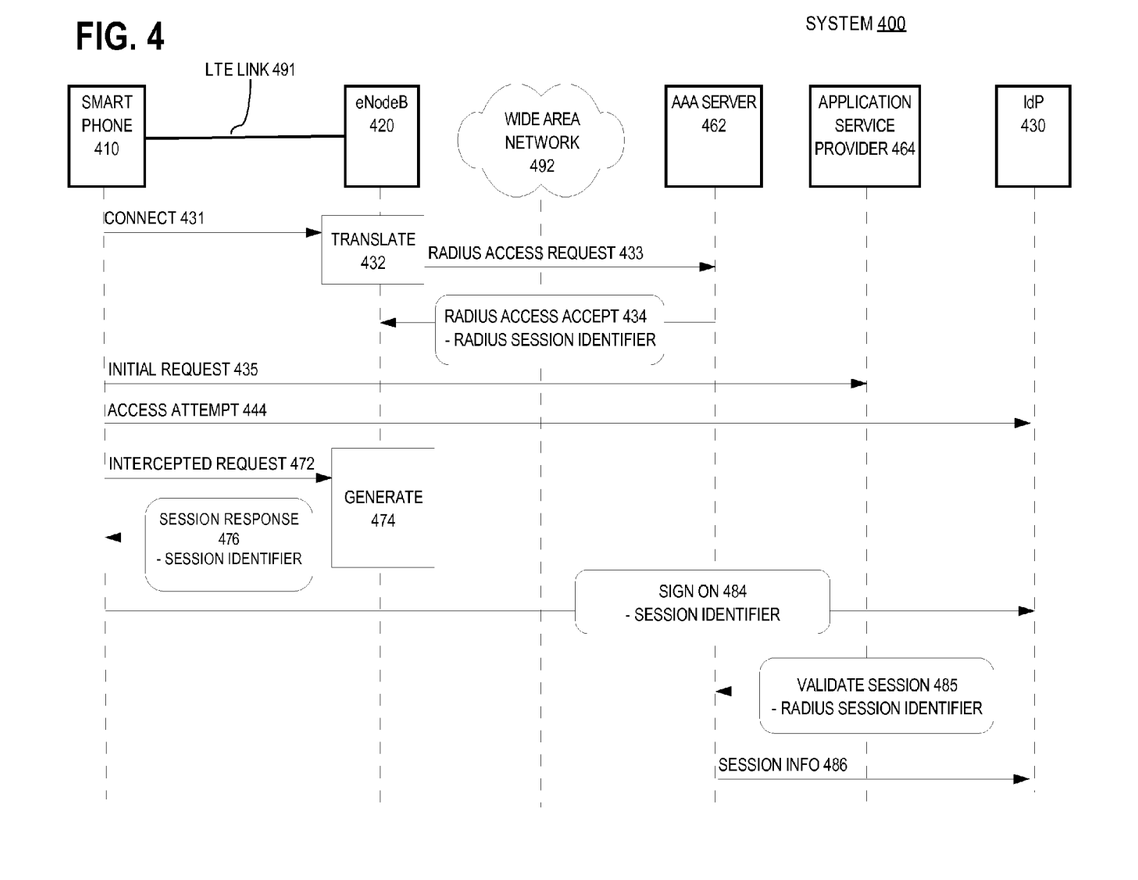
FIG. 4 illustrates an embodiment of a network system that securely transfers a session identifier.

FIG. 4 illustrates an embodiment of network system 400 using encrypted radio and operated according to the remote authentication dial in user service (RADIUS) protocol. Network system 400 exemplifies a typical deployment for a roaming party. Network system 400 may be an implementation of network system 100, although network system 100 may have other implementations. Network system 400 comprises smartphone 410, evolved node B (eNodeB) 420, wide area network (WAN) 492, authentication/authorization/accounting (AAA) server 462, application service provider (ASP) 464, IdP 430, and long-term evolution (LTE) link 491.

Smartphone 410 may be an implementation of client computer 110. IdP 430 may be an implementation of IdP 130. ENodeB 420 may be an implementation of NAD 120. ENodeB 420 may be a cellular telephony base station or other wireless access point. LTE link 491 may be an implementation of secure network link 191. LTE link 491 may be a cipher encrypted radio channel such as LTE or worldwide interoperability for microwave access (WiMAX). For example, third and fourth generation (3G or 4G) air interfaces are sufficiently secure. WAN 492 may be an implementation of insecure network 192. The telephony core network of a cellular provider is part of WAN 492. AAA server 462 may be any networked computer that implements an AAA protocol such as RADIUS or Diameter. An implementation of AAA server 462 may be a widely distributed team of specialized AAA servers such as an access network AAA server, a broker AAA server, a home AAA server, and a visited AAA server. ASP 464 may be any networked computer that hosts a secure web service.

Components of FIG. 1 that are implemented in FIG. 4 may also have other implementations. Some features of FIG. 4 may be achieved with other implementations of FIG. 1. For example, RADIUS does not require cellular telephony. Some implementation choices of FIG. 4 are offered only as examples. With the exception of LTE link 491, which may have a range of 80 kilometers, the components of network system 400 may be dispersed globally and interact over WAN 492.

Although network system 400 implements the features of network system 100, not all of the essential interactions of FIG. 1 are shown in FIG. 4. Instead, FIG. 4 shows only those essential interactions that demonstrate custom features of network system 400. For example, preceding redirected URL 154 is absent from FIG. 4 although this feature still occurs in network system 400.

5.1 Preparatory Phase

Network system 400 begins with a preparatory phase that is shown in FIG. 4. In this example, smartphone 410 recently landed at an airport and requests acquisition of LTE link 491, shown as connect 431. Upon receipt of connect 431, on behalf of smartphone 410, and with assistance of the telephony core network, eNodeB 420 performs translate 432 to generate RADIUS access request 433, which eNodeB 420 sends to AAA server 462. In response to receiving RADIUS access request 433, AAA server 462 generates a RADIUS session identifier that is unique and sends the RADIUS session identifier within RADIUS access accept 434 to eNodeB 420. Although smartphone 410 has joined the RADIUS network, additional authentication occurs before smartphone 410 may use a service of ASP 464.

Although not show and upon receipt of RADIUS access accept 434, eNodeB 420 generates a session identifier that includes the RADIUS session identifier and then sends the session identifier to smartphone 410. Smartphone 410 then sends initial request 435 to ASP 464 as an attempt to activate a service. Upon receipt of initial request 435, ASP 464 detects that initial request 435 occurred without authorization and, although not shown, responds by sending an URL redirect to smartphone 410. The URL redirect specifies IdP 430 as a target.

5.2 General Process

By this time, network system 400 has completed the preparatory phase. Network system 400 now begins the general process that is also shown in FIG. 1. Upon receipt of the URL redirect sent by ASP 464, smartphone 410 uses the URL redirect to send access attempt 444 to IdP 430. Access attempt 444 is an implementation of first HTTPS request 144, the first interaction of FIG. 1. Upon receipt of access attempt 444 and although not shown, IdP 430 detects that access attempt 444 is unauthenticated and sends preceding redirected URL 154 to smartphone 410.

Upon receipt of preceding redirected URL 154, smartphone 410 uses it to send intercepted request 472, which is an implementation of particular request 172. Upon receipt of intercepted request 472, eNodeB 420 generates a session identifier by performing generate 474, which is an implementation of generate 174. ENodeB 420 then sends session response 476, which is an implementation of particular response 176. Session response 476 delivers the session identifier to smartphone 410.

By this time, smartphone 410 is ready to achieve a federated sign on. Smartphone 410 sends sign on 484, which includes the session identifier, to IdP 430. Sign on 484 is an implementation of second HTTPS request 184, which is the last interaction of FIG. 1. However, federated sign on is not yet complete. Upon receipt of sign on 484, IdP 430 delegates session validation. IdP 430 extracts the RADIUS session identifier from within the session identifier and sends the RADIUS session identifier to AAA server 462, shown as validate session 485. AAA server 462 responds by sending session info 486, which may be rich with user account data such as permissions and quotas that IdP 430 can use for access control. IdP 430 may return a security ticket or other temporary credential. Smartphone 410 is signed on and may use the temporary credential to activate services of relying party applications.

6.0 SAML Deployment

Figure 5:
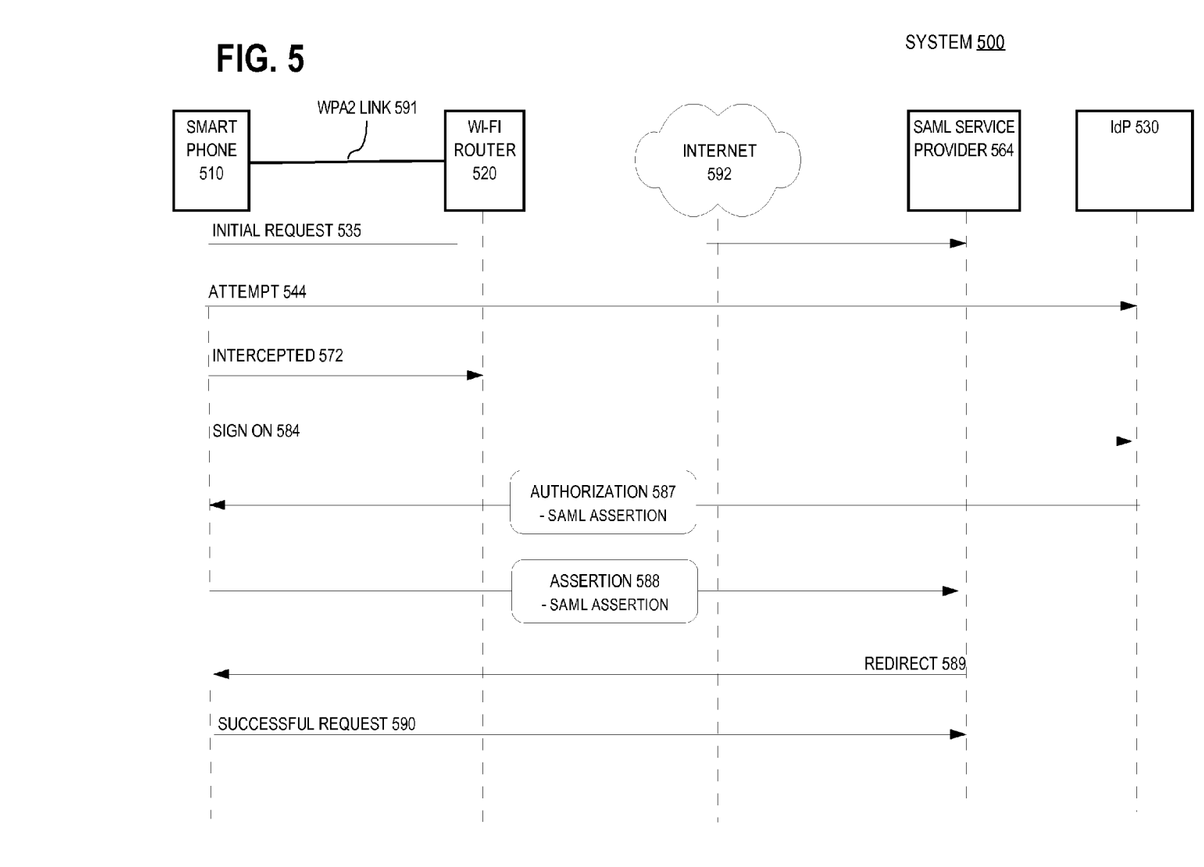
FIG. 5 illustrates an embodiment of a network system that securely transfers a session identifier.

FIG. 5 illustrates an embodiment of network system 500 using encrypted radio and operated with a SAML profile. Network system 500 exemplifies a typical wireless office deployment. Network system 500 may be an implementation of network system 100, although network system 100 may have other implementations. Network system 500 comprises smartphone 510, wireless fidelity (Wi-Fi) router 520, internet 592, SAML service provider 564, IdP 530, and Wi-Fi protected access 11 (WPA2) link 591.

Smartphone 510 may be an implementation of client computer 110. IdP 530 may be an implementation of IdP 130. IdP 530 is configured to issue SAML assertions. Wi-Fi router 520 may be an implementation of NAD 120. Wi-Fi router 520 may be any wireless access point. WPA2 link 591 may be an implementation of secure network link 191. Internet 592 may be an implementation of insecure network 192. SAML service provider 564 may be any networked computer that hosts a web service that consumes SAML assertions.

Components of FIG. 1 that are implemented in FIG. 5 may also have other implementations. Some of the features of FIG. 5 may be achieved with other implementations of FIG. 1. For example, SAML does not require Wi-Fi. Some implementation choices of FIG. 5 are offered only as examples. With the exception of WPA2 link 591, which may have a range of 30 meters, the components of network system 500 may be dispersed globally and interact over internet 592.

Although network system 500 implements the features of network system 100, not all of the essential interactions of FIG. 1 are shown in FIG. 5. Instead, FIG. 5 shows only those essential interactions that demonstrate custom features of network system 500. For example, preceding redirected URL 154 is absent from FIG. 5 although this feature still occurs in network system 500.

6.1 SAML Profile

A SAML profile is a standardized interaction sequence for using federated security to access a web service. This example implements the web browser SSO profile, which is the primary profile of SAML 2.0. Despite its name, the web browser SSO profile does not require a web browser, lets a dedicated client application embed an HTTP user agent, can work with a headless client, and does not need human interaction.

Network system 500 begins with a preparatory phase that is specified by the web browser SSO profile and shown in FIG. 5. In this example, smartphone 510 begins by sending initial request 535 to SAML service provider 564 as an attempt to activate a service. Upon receipt of initial request 535, SAML service provider 564 detects that initial request 535 occurred without authorization and, although not shown, responds by sending an URL redirect to smartphone 510. The URL redirect specifies IdP 530 as a target.

By this time network system 500 has completed the preparatory phase. Network system 500 now begins the general process that is also shown in FIG. 1. Upon receipt of the URL redirect sent by SAML service provider 564, smartphone 510 uses the URL redirect to send access attempt 544 to IdP 530. Access attempt 544 is an implementation of first HTTPS request 144, the first interaction of FIG. 1. Upon receipt of access attempt 544 and although not shown, IdP 530 detects that access attempt 544 is unauthenticated and sends preceding redirected URL 154 to smartphone 510. The web browser SSO profile requires that preceding redirected URL 154 include a SAML <AuthnRequest> element.

Upon receipt of preceding redirected URL 154, smartphone 510 uses it to send intercepted 572, which is an implementation of particular request 172. Upon receipt of intercepted 572 and although not shown, Wi-Fi router 520 generates a session identifier. Although not shown, Wi-Fi router 520 then sends particular response 176. Session response 176 delivers the session identifier to smartphone 510.

By this time, smartphone 510 is ready to achieve a federated sign on. Smartphone 510 sends sign on 584, which includes the session identifier, to IdP 530. The web browser SSO profile requires that sign on 584 use the GET verb and include a copy of the <AuthnRequest> element of preceding redirected URL 154. Sign on 584 is an implementation of second HTTPS request 184, which is the last interaction of FIG. 1. However, federated sign on is not yet complete. Upon receipt of sign on 484, IdP 430 generates a SAML assertion, which IdP 430 sends in authorization 587 to smartphone 510. The web browser SSO profile requires that authorization 587 use the POST verb and contain an extensible HTML (XHTML) form having a SAML <Response> element that includes the SAML assertion. Smartphone 510 is signed on and may use the SAML assertion to activate services of relying party applications.

The web browser SSO profile is incomplete until smartphone 510 uses the SAML assertion to access a web service.

The web browser SSO profile requires that a service access occurs in steps. First, smartphone 510 sends assertion 588 to SAML service provider 564. The web browser SSO profile requires that assertion 588 use the POST verb and include a copy of the <Response> element of authorization 587. Upon receipt of assertion 588, SAML service provider 564 sends redirect 589 to smartphone 510. Smartphone 510 uses redirect 589 to send successful request 590 that accesses a web service of SAML service provider 564. Upon receipt of successful request 590 and although not shown, SAML service provider 564 performs the requested service and sends a response, which completes the web browser SSO profile.

7.0 VPN Deployment

Figure 6:
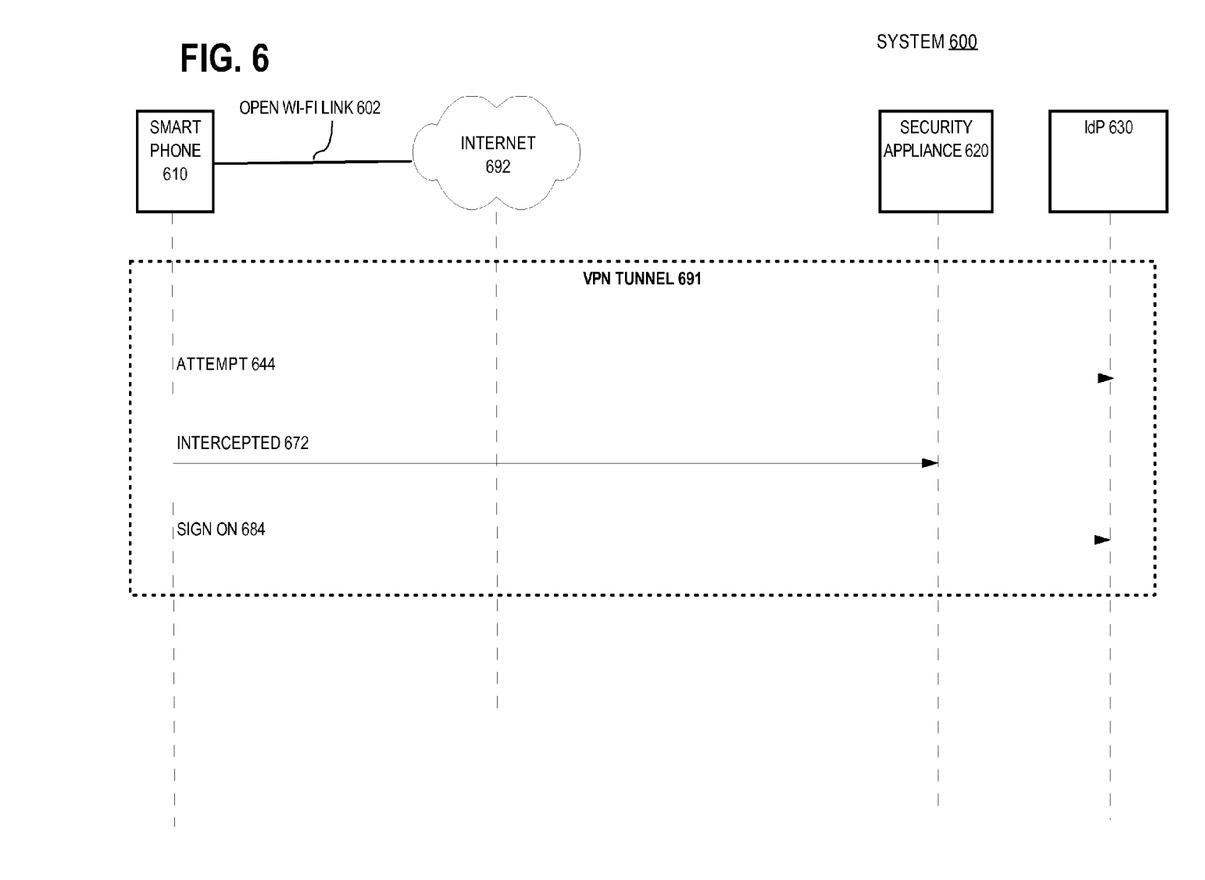
FIG. 6 illustrates an embodiment of a network system that securely transfers a session identifier.

FIG. 6 illustrates an embodiment of network system 600 using a VPN tunnel over insecure radio. Network system 600 exemplifies a secure overlay network atop a public wireless access point, such as when a customer at a public hotspot accesses a restricted web portal. Network system 600 may be an implementation of network system 100. Network system 600 comprises smartphone 610, security appliance 620, internet 692, IdP 630, insecure Wi-Fi link 602, and VPN tunnel 691.

Smartphone 610 may be an implementation of client computer 110. IdP 630 may be an implementation of IdP 130. Security appliance 620 may be an implementation of NAD 120, such as a Cisco Adaptive Security Appliance. Open Wi-Fi link 602 may be any wireless link such as Bluetooth, Wi-Fi, WiMAX, satellite, or cellular telephony. Open Wi-Fi link 602 need not be encrypted, secure, or trusted. Open Wi-Fi link 602 and internet 692 may be implementations of insecure network 192. VPN tunnel 691 may be an implementation of secure network link 191. VPN tunnel 691 may use any VPN tunneling protocol that has encryption and authentication.

Although network system 600 implements the features of network system 100, not all of the essential interactions of FIG. 1 are shown in FIG. 6. For example, preceding redirected URL 154 is absent from FIG. 6 although this feature still occurs in network system 600.

The components of network system 600 may be dispersed globally and interact over internet 692. Other embodiments of network system 100 of FIG. 1 physically place NAD 120 between client computer 110 and insecure network 192. Network system 600 instead uses a modified network system topology. Network system 600 physically places internet 692 between smartphone 610 and security appliance 620. Physical proximity between smartphone 610 and security appliance 620 is unnecessary.

Although not shown, network system 600 begins with an introductory phase of handshaking between smartphone 610 and security appliance 620 to establish VPN tunnel 691. Smartphone 610 may send a security token or password to security appliance 620 for VPN authentication. All subsequent communication between smartphone 610 and either security appliance 620 or IdP 630 may occur through VPN tunnel 691.

After establishing VPN tunnel 691, network system 600 begins the general process shown in FIG. 1. Smartphone 610 sends access attempt 644 to IdP 630. Access attempt 644 is an implementation of first HTTPS request 144, the first interaction of FIG. 1. Upon receipt of access attempt 644 and although not shown, IdP 530 detects that access attempt 644 is unauthenticated and sends preceding redirected URL 154 to smartphone 610.

Upon receipt of preceding redirected URL 154, smartphone 610 processes it to send intercepted 672, which is an implementation of particular request 172. Upon receipt of intercepted 672 and although not shown, security appliance 620 generates a session identifier. Although not shown, security appliance 620 then sends particular response 176. Session response 176 delivers the session identifier to smartphone 610.

By this time smartphone 610 is ready to accomplish a federated sign on. Smartphone 610 sends sign on 684, which includes the session identifier, to IdP 630. Sign on 684 is an implementation of second HTTPS request 184, which is the last interaction of FIG. 1. Smartphone 610 is signed on and may activate services of relying party applications, such as a restricted web portal.

8.0 Hardware Overview

Figure 7:
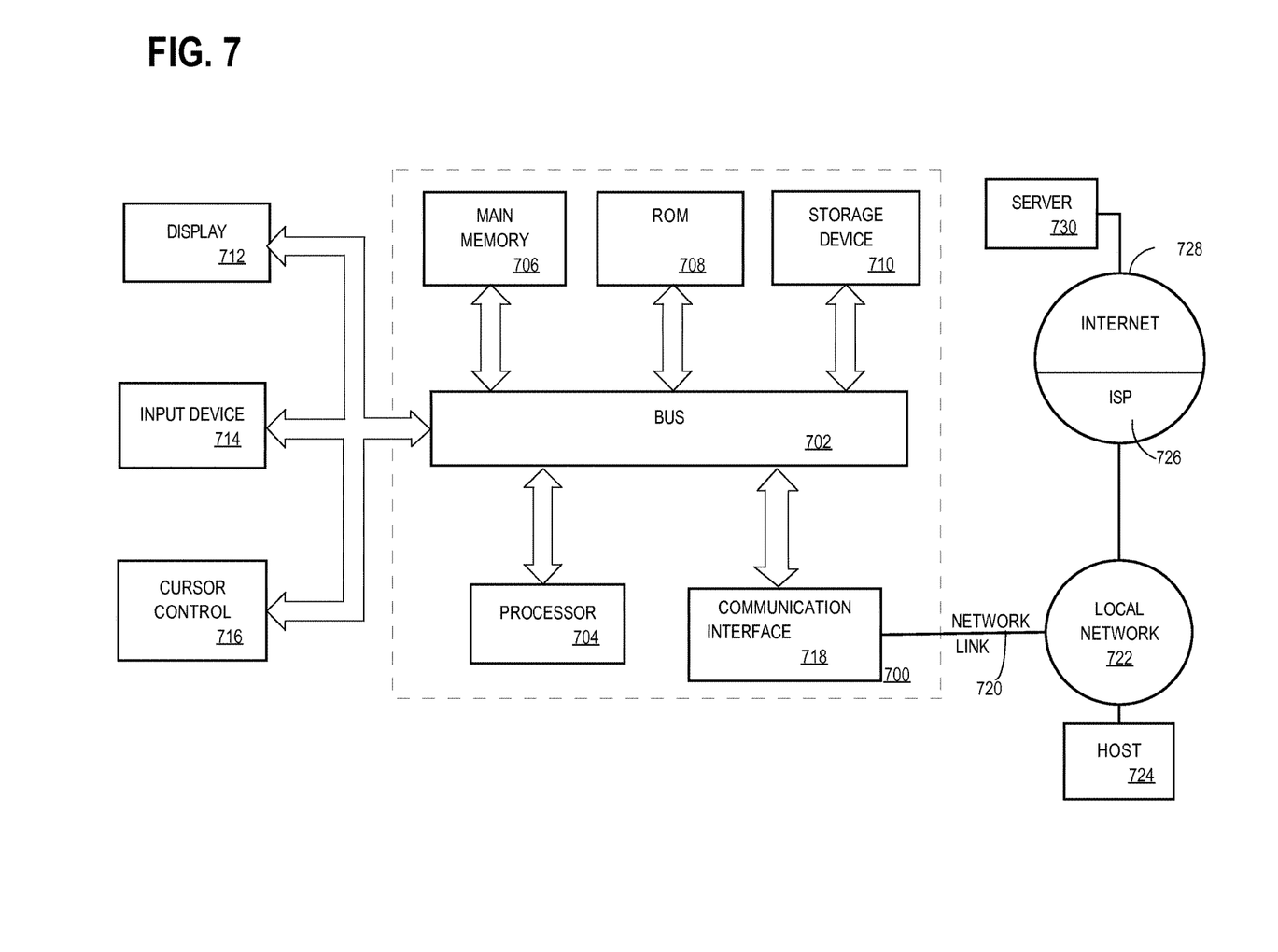
FIG. 7 illustrates a computer system upon which an embodiment may be implemented.

FIG. 7 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 718. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Internet 728.

According to one embodiment, compliance management is provided by computer system 700 in response to processor 704 executing one or more sequences of one or more instructions contained in main memory 706. Such instructions may be read into main memory 706 from another computer-readable medium, such as storage device 710.

Execution of the sequences of instructions contained in main memory 706 causes processor 704 to perform the process steps described herein. One or more processors in a multiprocessing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any medium that participates in providing instructions to processor 704 for execution. Such a medium may take many forms, including but not limited to, non-transitory and non-volatile storage media and non-transitory volatile storage media. Non-volatile storage media includes, for example, optical or magnetic disks, such as storage device 710. Volatile storage media includes dynamic memory, such as main memory 706.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other non-transitory, tangible storage medium from which a computer can read.

Various forms of computer readable storage media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for compliance management as described herein. The received code may be executed by processor 704 as it is received, and/or stored in storage device 710, or other non-volatile storage for later execution.

9.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense.

What is claimed is:

1. A method comprising:
establishing a secure network link having a client computer and a network access device (NAD) as endpoints;
over the secure network link, a client computer transferring a first hypertext transfer protocol secure (HTTPS) request to a network access device (NAD), wherein the first HTTPS request is addressed to an identity provider computer;
the NAD transferring the first HTTPS request to the identity provider computer;
transferring, by the NAD, from the identity provider computer, a preceding redirected uniform resource locator (URL) in response to the first HTTPS request, to the client computer, wherein the preceding redirected URL is configured to cause the client computer to redirect to said preceding redirected URL;
over a secure network link, the NAD receiving a particular request specifying said preceding redirected URL, from the client computer;
in response to receiving the particular request, the NAD generating a particular response, the particular response comprising a subsequent redirected URL and a session identifier, wherein the subsequent redirected URL is configured to cause the client computer to redirect to the identity provider computer over an HTTPS connection;
transferring, by the NAD, said subsequent redirected URL over the secure network link to the client computer;
transferring, by the NAD, a second HTTPS request, comprising the session identifier, from the client computer to the identity provider computer.

2. The method of claim 1 wherein said preceding redirected URL comprises a host identifier of the identity provider computer, and wherein the NAD receiving the particular request comprises the NAD intercepting the particular request.

3. The method of claim 1 wherein said preceding redirected URL specifies using hypertext transfer protocol (HTTP).

4. The method of claim 1 wherein said subsequent redirected URL comprises a query string that includes the session identifier.

5. The method of claim 1 wherein said preceding redirected URL comprises a session cookie, and the second HTTPS request comprises the session cookie.

6. The method of claim 1 wherein the secure network link comprises one of: an 802.11 robust security network (RSN) link, or an 802.1 advanced encryption (AE) link.

7. The method of claim 1 wherein a security assertion markup language (SAML) element is included in at least one of: said preceding redirected URL and the second HTTPS request.

8. The method of claim 1 wherein the session identifier is based at least in part on a session identifier of an Authentication/Authorization/Accounting (AAA) protocol selected from: remote authentication dial in user service (RADIUS) or Diameter.

9. The method of claim 1 wherein the secure network link comprises at least one of: a direct cable between the client computer and the NAD, or physical security between the client computer and the NAD.

10. A device comprising:
a communication interface configured to operate a secure network link that has a client computer and the device as endpoints;
a processor coupled to the communication interface; and
a processor logic coupled to the processor and the communication interface, and configured to:
over the secure network link, receive a first hypertext transfer protocol secure (HTTPS) request from a client computer, wherein the first HTTPS request is addressed to an identity provider computer;
transfer the first HTTPS request to the identity provider computer;
transfer, from the identity provider computer, a preceding redirected URL in response to the first HTTPS request, to the client computer and configured to cause the client computer to redirect to said preceding redirected URL;
over the secure network link, receive a particular request specifying said preceding redirected URL, from the client computer;
in response to receiving the particular request, generate a particular response, comprising a subsequent redirected URL and a session identifier, and configured to cause the client computer to redirect to the identity provider computer over an HTTPS connection;
transfer said subsequent redirected URL over the secure network link to the client computer; and
transfer a second HTTPS request, comprising the session identifier, from the client computer to the identity provider computer.

11. The device of claim 10 wherein said preceding redirected URL comprises a host identifier of the identity provider computer, and wherein receiving the particular request comprises intercepting the particular request.

12. The device of claim 10 wherein said preceding redirected URL specifies using HTTP.

13. The device of claim 10 wherein said subsequent redirected URL comprises a query string that includes the session identifier.

14. The device of claim 10 wherein said preceding redirected URL comprises a session cookie, and the second HTTPS request comprises the session cookie.

15. The device of claim 10 wherein the secure network link comprises one of: an 802.11 RSN link, or an 802.1 AE link.

16. The device of claim 10 wherein a SAML element is included in at least one of: said preceding redirected URL and the second HTTPS request.

17. The device of claim 10 wherein the session identifier is based at least in part on a session identifier of an AAA protocol selected from: RADIUS or Diameter.

18. One or more non-transitory computer readable media comprising instructions that when executed by one or more processors cause:
establishing a secure network link having a client computer and a network access device (NAD) as endpoints;
over the secure network link, a client computer transferring a first hypertext transfer protocol secure (HTTPS) request to a network access device (NAD), wherein the first HTTPS request is addressed to an identity provider computer;
the NAD transferring the first HTTPS request to the identity provider computer;
transferring, by the NAD, from the identity provider computer, a preceding redirected uniform resource locator (URL) in response to the first HTTPS request, to the client computer, wherein the preceding redirected URL is configured to cause the client computer to redirect to said preceding redirected URL;
over a secure network link, the NAD receiving a particular request specifying said preceding redirected URL, from the client computer;
in response to receiving the particular request, the NAD generating a particular response, the particular response comprising a subsequent redirected URL and a session identifier, wherein the subsequent redirected URL is configured to cause the client computer to redirect to the identity provider computer over an HTTPS connection;
transferring, by the NAD, said subsequent redirected URL over the secure network link to the client computer;
transferring, by the NAD, a second HTTPS request, comprising the session identifier, from the client computer to the identity provider computer.

19. The one or more non-transitory computer readable media of claim 18 wherein the secure network link comprises one of: an 802.11 robust security network (RSN) link, or an 802.1 advanced encryption (AE) link.

20. The one or more non-transitory computer readable media of claim 18 wherein a security assertion markup language (SAML) element is included in at least one of: said preceding redirected URL and the second HTTPS request.

21. The one or more non-transitory computer readable media of claim 18 wherein the session identifier is based at least in part on a session identifier of an Authentication/Authorization/Accounting (AAA) protocol selected from: remote authentication dial in user service (RADIUS) or Diameter.

* * * * *